(12) United States Patent
Shaffer et al.

(10) Patent No.: US 9,258,724 B2
(45) Date of Patent: Feb. 9, 2016

(54) METHOD AND SYSTEM FOR AUTOMATICALLY IDENTIFYING WIRELESS SIGNAL QUALITY OF A REGION

(71) Applicants: Shmuel Shaffer, Palo Alto, CA (US); Labhesh Patel, Sunnyvale, CA (US)

(72) Inventors: Shmuel Shaffer, Palo Alto, CA (US); Labhesh Patel, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/263,414

(22) Filed: Apr. 28, 2014

(65) Prior Publication Data

US 2014/0235177 A1    Aug. 21, 2014

Related U.S. Application Data (63) Continuation of application No. 14/041,406, filed on Sep. 30, 2013, now Pat. No. 8,712,436, which is a continuation of application No. 13/094,157, filed on Apr. 26, 2011, now Pat. No. 8,559,972, which is a continuation of application No. 11/768,738, filed on Jun. 26, 2007, now Pat. No. 7,941,108.

(51) Int. Cl.
| | |
|---|---|
| *H04B 17/00* | (2015.01) |
| *H04W 24/06* | (2009.01) |
| *G01C 21/20* | (2006.01) |
| *G01C 21/34* | (2006.01) |
| *H04W 64/00* | (2009.01) |

(52) U.S. Cl.
CPC .............. *H04W 24/06* (2013.01); *G01C 21/20* (2013.01); *G01C 21/3461* (2013.01); *H04W 64/006* (2013.01)

(58) Field of Classification Search
CPC ....... H04Q 7/20; H04W 64/006; H04W 4/025
USPC ........................................... 455/456.1, 67.11
See application file for complete search history.

(56) References Cited

U.S. PATENT DOCUMENTS

| | | | |
|---|---|---|---|
| 5,796,338 A | 8/1998 | Mardirossian | |
| 5,844,522 A | 12/1998 | Sheffer et al. | |
| 6,233,455 B1 | 5/2001 | Ramakrishna et al. | |
| 6,552,661 B1 * | 4/2003 | Lastinger ............. | G06K 7/0008 340/572.1 |
| 6,580,394 B2 * | 6/2003 | Wang .................. | H04B 7/0615 342/367 |
| 6,917,880 B2 * | 7/2005 | Bergin .................... | G01S 7/412 342/417 |
| 6,922,629 B2 * | 7/2005 | Yoshikawa ....... | G08G 1/096716 340/995.13 |
| 7,003,261 B2 * | 2/2006 | Dietz .................... | H04W 88/04 340/905 |
| 7,031,713 B2 * | 4/2006 | Schwinke ............. | H04W 48/20 370/329 |
| 7,072,311 B1 * | 7/2006 | Czaja .................... | H04W 36/14 370/318 |
| 7,133,685 B2 * | 11/2006 | Hose ...................... | G08G 1/207 340/990 |
| 7,522,927 B2 * | 4/2009 | Fitch ........................ | G01S 5/12 340/7.22 |
| 7,525,484 B2 * | 4/2009 | Dupray ..................... | G01S 5/12 342/450 |
| 7,551,927 B2 * | 6/2009 | McKenna ............... | H04W 8/26 455/411 |

(Continued)

*Primary Examiner* — April G Gonzales
(74) *Attorney, Agent, or Firm* — Baker Botts L.L.P.

(57) ABSTRACT

A method for automatically identifying wireless signal quality of a region includes receiving signal quality information associated with wireless signals received by each of a plurality of mobile endpoints and receiving location information identifying locations of each of the plurality of mobile endpoints. The method also includes, based on the received signal quality information and the received location information, identifying a first region of an area, the first region having a first signal quality.

25 Claims, 4 Drawing Sheets

(56) References Cited

U.S. PATENT DOCUMENTS

| | | | |
|---|---|---|---|
| 7,587,205 B1 * | 9/2009 | Odorfer | H04W 4/02 455/408 |
| 7,596,372 B2 * | 9/2009 | Warren | H04L 1/20 455/423 |
| 2006/0135180 A1 | 6/2006 | Jakel et al. | |
| 2008/0019332 A1 | 1/2008 | Oswal et al. | |
| 2008/0167049 A1 | 7/2008 | Karr et al. | |
| 2009/0005073 A1 * | 1/2009 | Shaffer | G01C 21/3461 455/456.2 |

* cited by examiner

METHOD AND SYSTEM FOR AUTOMATICALLY IDENTIFYING WIRELESS SIGNAL QUALITY OF A REGION

CROSS-REFERENCE TO RELATED APPLICATIONS

This application is a continuation of U.S. application Ser. No. 14/041,406 filed Sep. 30, 2013 and entitled "Method and System for Automatically Identifying Wireless Signal Quality of a Region", now U.S. Pat. No. 8,712,436 which is a continuation of U.S. application Ser. No. 13/094,157 filed Apr. 26, 2011 and entitled "Method and System for Automatically Identifying Wireless Signal Quality of a Region", now U.S. Pat. No. 8,559,972 which is a continuation of U.S. application Ser. No. 11/768,738 filed Jun. 26, 2007 and entitled "Method and System for Automatically Identifying Wireless Signal Quality of a Region", now U.S. Pat. No. 7,941,108.

TECHNICAL FIELD OF THE INVENTION

This invention relates in general to communication systems and, more particularly, to a method and system for automatically identifying wireless signal quality of a region.

BACKGROUND

Cellular service providers (CSP) provide wireless services to their subscribers in many areas of the country. However, coverage of their cellular network may still be spotty. Users who pass through areas with poor coverage may experience degradation of voice quality or call disconnection. Users who are annoyed by the spotty coverage may call their CSP and request that they add equipment to their network; however it can be a challenge to decide where to invest limited resources of the CSP in order to get the greatest impact for their investment. In addition, some locations may experience sporadic interference from other equipment. The interference may be confined to a limited area within a given cell and finding the area may prove to be a difficult task.

A similar scenario may exist in the enterprise environment where wireless phones are deployed. Many deployments require dedicated teams with special equipment to walk around buildings in an attempt to map the signal strength with the goal of optimizing the positioning of the wireless antennas. The site mapping process may need to be repeated a few times as the information technology department learns about the calling and mobility patterns of users and as the impact from local interferences is better understood.

Some CSPs implement GPS and other location technologies into their cellular phones and mobile devices. Some implementations allow users to communicate device location (e.g., latitude and longitudes) with multiple levels of precision. The devices may also enable notification ability wherein mobile devices provide intelligent alerts from within an enterprise based on business process and event triggers.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Overview

In accordance with a particular embodiment, a method for identifying wireless signal quality of a region includes receiving signal quality information associated with wireless signals received by each of a plurality of mobile endpoints and receiving location information identifying locations of each of the plurality of mobile endpoints. The method also includes, based on the received signal quality information and the received location information, identifying a first region of an area, the first region having a first signal quality.

Description

Figure 1:
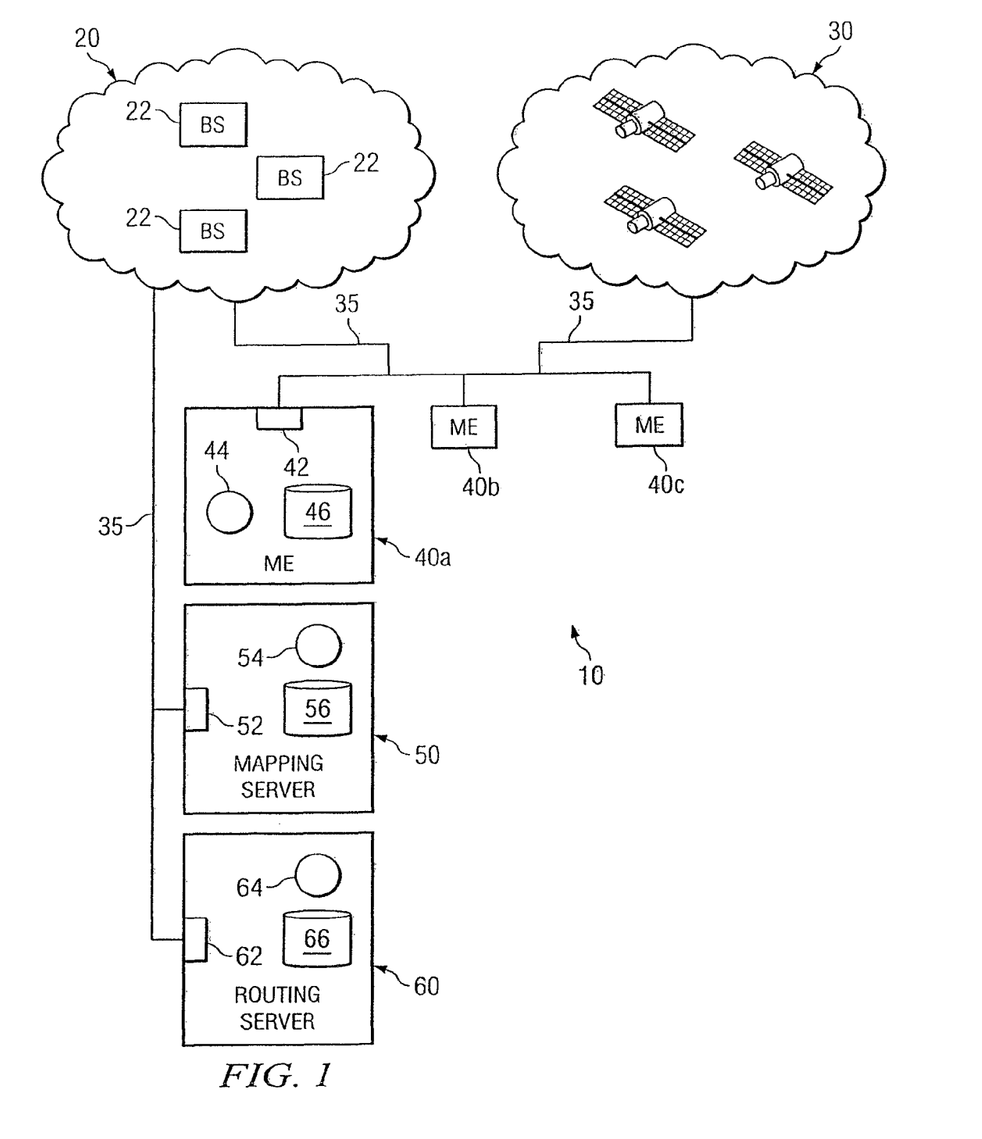
FIG. 1 illustrates a communication system with a plurality of mobile endpoints, a mapping server and a routing server, in accordance with a particular embodiment.

FIG. 1 illustrates a communication system 10 having the ability to establish communication sessions among mobile endpoints (MEs) 40, mapping server 50, routing server 60, communication networks 20 and 30 and other networks or communication system components. In particular embodiments, mobile endpoints 40 are able to communicate through and/or with a cellular network 20 and a satellite network 30. It should be understood, however, that communication system 10 may include any other suitable communication networks, such as IP networks, wide area networks (WANs), local area networks (LANs), public switched telephone networks (PSTNs) and other networks to enable communication through system components.

Particular embodiments utilize GPS or other location information and voice quality, signal quality or other quality information to create and continuously update a wireless signal integrity map. The automatic update of a wireless and cellular signal integrity map reduces the need to send dedicated technicians to an area under surveillance. In an enterprise, this may reduce the necessity to order an expensive site survey in the event that antennas have been inadvertently moved. In a service provider, this may enable the service provider to get instantaneous updates about the impact of new construction (e.g., new buildings) that may affect the integrity of cellular or other wireless signals. These features may reduce the overall cost of ownership of a cellular or other wireless network.

In addition, some embodiments utilize a cell coverage map identifying areas of differing signal quality to calculate directions. For example, an area of poor signal quality may be avoided in the calculation, modification or update of a route so that a user traveling on the route will have a reduced chance of poor call quality.

In the illustrated embodiment, communication network 20 is a cellular network with base stations (BSs) 22 for enabling communication of mobile endpoints 40. Cellular network 20 may also include other components, such as mobile switching centers and a series of points or nodes of interconnected communication paths for receiving and transmitting circuit or packet-switched information that propagates to or from mobile endpoints 40. Cellular network 20 offers a communicative interface between mobile endpoints 40 and any suitable location within or external to communication system 10. Cellular network 20 may comprise a global system for mobile (GSM) architecture. In particular embodiments, cellular network 20 may comprise code division multiple access (CDMA), time division multiple access (TDMA) or frequency division multiple access (FDMA) environments. Cellular network 20 may cooperate with any version of a general packet radio service (GPRS) tunneling protocol (GTP) that includes a platform for executing data management operations. This may be inclusive of first generation, 2G, and 3G architectures that deliver a service or a capability to one or more clients or end users.

BSs 22 provide bi-directional communication with mobile endpoints 40 over wireless links. BSs 22 may comprise any hardware, software, firmware or combination thereof operable to communicate with mobile endpoints 40. BSs 22 may, for example, comprise one or more base transceiver stations that may comprise radio transmission/reception devices, components or objects, and antennas. BSs 22 may also comprise one or more base station controllers that operate as a management component for a radio interface. This management may be executed through remote commands to a base transceiver station within cellular network 20. The base station controllers may manage more than one base transceiver station. Some of the responsibilities of a base station controller may include management of radio channels in assisting in handover scenarios. Any number of suitable communications objects or elements may be included within, external to, or coupled to components of BSs 22, such as base station controllers and base transceiver stations.

While the embodiment illustrated in FIG. 1 illustrates a cellular network as enabling communication of mobile endpoints 40, other embodiments may utilize any suitable communication protocols and systems to implement features and functionality described herein. For example, other embodiments may include mobile endpoints communicating through one or more wide area networks (WANs), local area networks (LANs) or other networks using Internet protocol (IP), voice over wireless IP networks or other technology to implement the features and functionality described herein.

Communication network 30 comprises a global positioning satellite (GPS) network through which mobile endpoints 40 may communicate in order to determine their locations. Communicate network 30 may include hardware and software, including appropriate controlling logic, capable of providing position information related to the location of a mobile endpoints 40. For example, as illustrated, communication or GPS network 30 includes a plurality of GPS satellites. Alternatively, network 30 may represent a differential GPS (DGPS) system. Accordingly, network 30 may comprise a network of fixed ground based reference stations operable to broadcast differences between positions identified by a satellite and known fixed positions. In the illustrated embodiment, network 30 may communicate with a receiver/interface in mobile endpoints 40 using any suitable communications protocol. Additionally, communications with mobile endpoints 40 may occur directly or indirectly through other components or networks of communication system 10.

While the embodiment illustrated in FIG. 1 illustrates a GPS network as providing the ability to determine locations of mobile endpoints 40, other embodiments may employ other networks or technologies to determine such location information. For example, some embodiments may utilize triangulation technologies using BSs 22 of network 20 instead of or in addition to utilizing GPS or other location-identifying technologies.

Communication links 35 couple, through one or more communication protocols, networks 20 and 30, mobile endpoints 40, mapping server 50 and routing server 60. Communication links may include wireless or wireline links and may include communication networks to facilitate communication among the linked components and networks. While particular communication networks are illustrated and described herein, various embodiments may be implemented using one or more other communication networks. Communication networks implementing various embodiments may include a plurality of segments and nodes coupling mobile endpoints 40, mapping server 50 and routing server 60. Such nodes may include any combination of network components, gatekeepers, call managers, conference bridges, routers, hubs, switches, gateways, base stations, endpoints or other hardware, software or embedded logic implementing any number of communication protocols that allow for the exchange of data in communication system 10.

Mobile endpoints 40 may comprise mobile phones, cellular phones, IP phones, personal digital assistants (PDAs), personal computers (PCs) or any other communication hardware, software and/or encoded logic that supports the communication of audio, video or other data, using packets of media (or frames) or otherwise. In the illustrated embodiment, mobile endpoints 40 include an interface 42, a processor 44 and memory module 46. Interface 42 may include any suitable hardware, software or encoded logic for transmitting and/or receiving communication signals to and from one or more communication networks, such as networks 20 and 30. For example, interface 42 may include appropriate hardware, software or encoded logic for communicating with base stations 22 of network 20 and for communicating with components of GPS network 30. Mobile endpoints 40 may also include a user interface comprising a keypad, display, touch screen, speaker, microphone or other audio, video or data input/output for receiving and communicating information from and to a user.

Processor 44 may be a microprocessor, controller, or any other suitable computing device, resource, or combination of hardware, software and/or encoded logic operable to perform functionality associated with mobile endpoints 40. Processor 44, either alone or in conjunction with other endpoint components, provides mobile endpoint functionality discussed herein such as call capability and navigation capability. Memory module 46 may be any form of volatile or non-volatile memory including, without limitation, magnetic media, optical media, random access memory (RAM), read-only memory (ROM), removable media, or any other suitable local or remote memory component, for storing information associated with the mobile endpoint functionality discussed herein.

Some of mobile endpoints 40 may include navigation functionality to display or otherwise communicate to a user, such as a driver or passenger of a vehicle, route information, or directions, to a particular destination. Such display or other communication may occur through text, graphical images, audio and/or other suitable methods. The route information may be calculated by and received from routing server 60. A particular destination may be input and/or selected by the user at a mobile endpoint 40 through a user interface, such as a keypad. In some embodiments, a user may input and/or select destination information using one or more spoken commands via speech recognition technology. It should be understood that not all of mobile endpoints 40 may include navigation functionality, and not all of mobile endpoints 40 may include phone call capability.

Mapping server 50 receives signal quality and location information and identifies areas of various signal qualities based on the received information. Mapping server 50 may comprise any suitable hardware, software or encoded logic for performing the functionality described herein as associated with the mapping server. In the illustrated embodiment, mapping server 50 includes an interface 52, a processor 54 and memory module 56. Interface 52 may include any suitable hardware, software or encoded logic for transmitting and/or receiving communication signals to and from one or more communication networks, such as networks 20. Interface 52 may facilitate communications between mobile endpoints 40 and mapping server 50. Processor 54 may be a microprocessor, controller, or any other suitable computing device, resource, or combination of hardware, software and/or encoded logic operable to perform functionality associated with mapping server 50. Memory module 56 may be any form of volatile or non-volatile memory including, without limitation, magnetic media, optical media, random access memory (RAM), read-only memory (ROM), removable media, or any other suitable local or remote memory component, for storing information associated with the mobile endpoint functionality discussed herein.

Routing server 60 receives regional signal quality information (e.g., such as that identified by mapping server 50) and determines navigation information based on the received regional signal quality information. Routing server 60 may comprise any suitable hardware, software or encoded logic for performing the functionality described herein as associated with the mapping server. In the illustrated embodiment, routing server 60 includes an interface 62, a processor 64 and memory module 66. Interface 62 may include any suitable hardware, software or encoded logic for transmitting and/or receiving communication signals to and from one or more communication networks, such as networks 20. Interface 62 may facilitate communications between mobile endpoints 40 and routing server 60 as well as communication between mapping server 50 and routing server 60. Processor 64 may be a microprocessor, controller, or any other suitable computing device, resource, or combination of hardware, software and/or encoded logic operable to perform functionality associated with routing server 60. Memory module 66 may be any form of volatile or non-volatile memory including, without limitation, magnetic media, optical media, random access memory (RAM), read-only memory (ROM), removable media, or any other suitable local or remote memory component, for storing information associated with the mobile endpoint functionality discussed herein.

Figure 2:
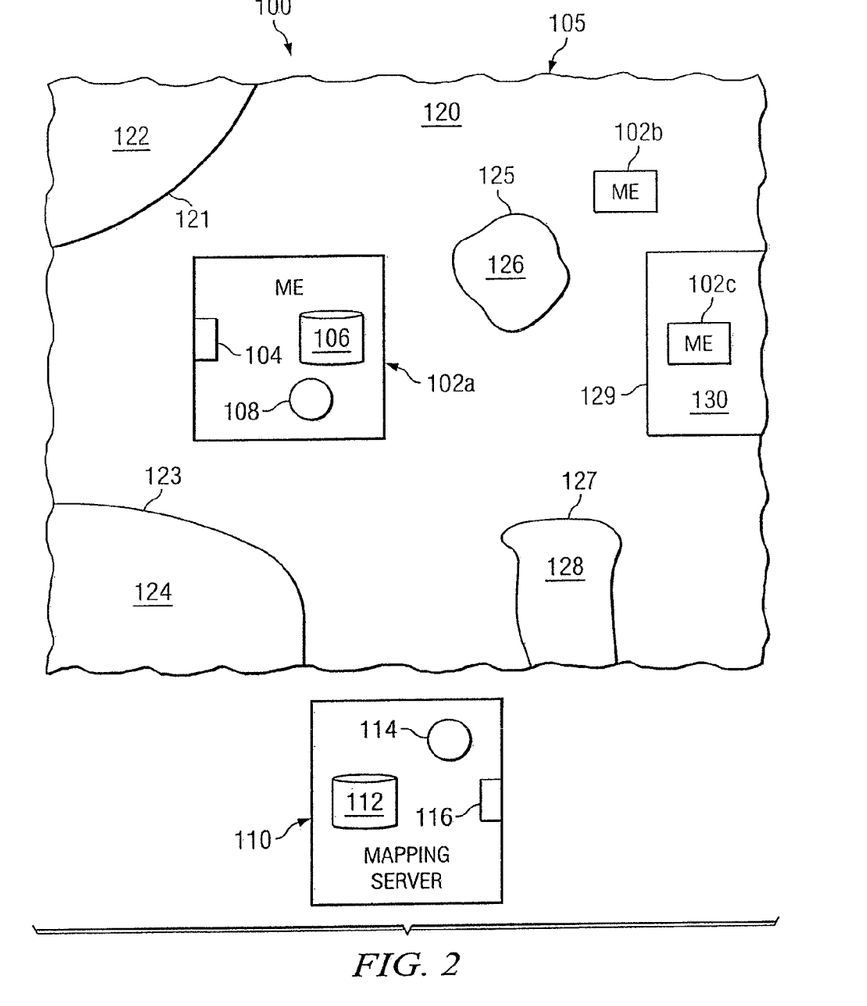
FIG. 2 illustrates aspects of operation of a mapping server with respect to a geographic area, in accordance with a particular embodiment.

FIG. 2 illustrates a communication system 100 for identifying wireless signal quality of a region, in accordance with a particular embodiment. Communication system 100 includes a plurality of mobile endpoints 102 in a geographic area 105. Communication system 100 also includes mapping server 110 which may communicate with mobile endpoints 102 through one or more communication networks, such as communication network 20 of FIG. 1.

Mobile endpoints 102 include an interface 104, a processor 108 and a memory module 106. Mobile endpoints 102 may be similar to mobile endpoints 40 of FIG. 1, and the interface, processor and memory module of mobile endpoints 102 may be similar to those components of mobile endpoints 40. Mobile endpoints 102 may communicate with each other and with other mobile endpoints, communication endpoints or network components through one or more communication networks such as cellular communication network 20 of FIG. 1. Mobile endpoints 102 may also communicate with a GPS network or another network to determine location information.

Mapping server 110 includes an interface 116, a processor 114 and a memory module 112. Mapping server 110 may be similar to mapping server 50 of FIG. 1, and the interface, processor and memory module of mapping server 110 may be similar to those components of mapping server 50.

Geographic area 105 may represent any size area, such as a state, a city, a suburb, a zip code area, a campus a building or any other smaller or larger area. In the illustrated embodiment, geographic area includes regions 120, 122, 124, 126, 128 and 130. These regions are identified in the illustration by lines or boundaries 121, 123, 125, 127 and 129. Communications of mobile endpoints 102 may be facilitated and supported by one or more communication networks in geographic area 105, such as communication network 20 of FIG. 1. Mobile endpoints 102 may receive varying communication signal quality in different regions of area 105. For example, when in region 120, a mobile endpoint may be better able to communicate with another endpoint or component than when in region 122. Reasons for varying signal quality in different regions may include placement or location of network components such as base stations, repeaters or other components and interference caused by particular network components or any other object. Signal quality may vary in different regions for any other particular reason.

In particular embodiments, mobile endpoints 102 monitor quality and/or energy of the wireless signals received by the endpoints through their interfaces 104. Processors 108 may compare the quality of the monitored signal against one or more energy thresholds, such as thresholds programmed in the endpoint. In some embodiments, the endpoint may be programmed with two energy thresholds which effectively define three energy bands—good, medium (acceptable) and low (unacceptable). As a user of a mobile endpoint 102 moves through area 105 (such as a building, a campus or another geographic area), the endpoint monitors its received energy/signal quality and compares it to the thresholds. Such monitoring may occur while the mobile endpoint is connected to an active call or while the mobile endpoint is not connected to an active call.

As the energy level crosses one of the thresholds, the endpoint communicates a notification to mapping server 110 informing it that a specific threshold was crossed at a specific location (e.g., a location identified by a specific latitude and longitude or a location identified by another identifier). The location may be identified through communications with a GPS network, triangulation or any other method. Mapping server 110 receives the notifications from endpoints 102 and from other endpoints communicating notifications in a similar manner across the particular locality. Mapping server stores in memory module 112 the information from each endpoint along with the identification of the endpoint from which the information was received. Based on this information, mapping server 110 can identify particular regions of good, medium and bad signal quality (or any other relative identifiers of signal quality). For example, based on this information mapping server 110 can create a map identifying the regions by boundaries as illustrated in FIG. 2. In this example, boundaries 121, 123, 125, 127 and 129 may identify locations where quality thresholds changed from one spot to another (thus forming regions 120, 122, 124, 126, 128 and 130 of varying signal quality). Practically, regions may end up identifying any size area of differing signal quality, such as a cold spot in a city, a particular building, a particular room or a particular spot or area in a room. Mapping server 110, through for example processor 114, may update and change the created map based on continuing signal quality and location notifications received from mobile endpoints. In particular embodiments, mapping server 110 may notify a system administrator information about the varying signal quality in different regions, such as the number of mobile endpoints that cross into a particular signal quality region in a given time period. A low signal quality region in which fewer mobile endpoints enter may be less of a priority for repair or upgrade than a low signal quality region in which a greater number of mobile endpoints enter.

In some embodiments, other information may be monitored and used to identify signal quality for the mapping process. For example, the jitter buffers of endpoints 102 may be monitored for voice degradation and for lost packets. Thresholds may be put into place to identify locations wherein various voice degradations are experienced (e.g., such as mild and major voice degradations). For example, a threshold may be implemented to identify a location where less than two consecutive voice packets are lost and a packet loss concealment algorithm can still compensate for the degradation of the wireless signal. This may, for example, indicate a medium or acceptable location for network quality. Another threshold may be implemented to identify a location where three or more consecutive packets are lost and a packet loss concealment algorithm is not able to mask the degradation in voice quality. This may indicate a poor or unacceptable location for network quality.

In some embodiments, mobile endpoints 102 may be configured to communicate to mapping server 110 notifications indicating when the endpoint is losing keep-alive signals with a base station. As indicated above, while mapping based on voice packets and jitter buffer information may require the user of the endpoint to be in an active call, mapping based on signaling information can be done regardless of whether mobile endpoint is in use on an active call or powered on in an idle state.

In some cases, mapping server 110 may receive differing signal quality levels or other differing measurements for a particular location from different mobile endpoints 102, because, for example, particular endpoints may report lower wireless energy than others. This may manifest itself by a specific endpoint reporting that it crossed an energy threshold earlier than other phones. To provide better reporting uniformity of energy levels across mobile endpoints, mapping server 110 or another system component may communicate new threshold settings to mobile endpoints whose thresholds appear off as compared to other endpoints. This will add consistency to the notifications received across various endpoints. In addition, system administrators may be alerted of phones with substandard receivers/interfaces, as identified by, for example, mapping server 110 or another system component.

While particular embodiments are described with respect to particular functionality of various components, other embodiments may implement features of particular embodiments in other ways. For example, while in some embodiments mobile endpoints may communicate their location information to a mapping server, in other embodiments a mapping server may receive such locations from other network components that are identifying or monitoring such mobile endpoint locations.

As discussed, particular embodiments utilize GPS or other location information and voice quality, signal quality or other quality information to create and continuously update a wireless signal integrity map. The automatic update of a wireless and cellular signal integrity map reduces the need to send dedicated technicians to an area under surveillance. In an enterprise, this may reduce the necessity to order an expensive site survey in the event that antennas have been inadvertently moved. In a service provider, this may enable the service provider to get instantaneous updates about the impact of new construction (e.g., new buildings) that may affect the integrity of cellular or other wireless signals. These features may reduce the overall cost of ownership of a cellular or other wireless network.

Additionally, features discussed herein provide an indicator about the importance of providing a fix to any specific cold spots. Particular embodiments provide an administrator and service provider with information regarding the number of mobile endpoints that cross into a medium or low signal quality region in any given location. The administrator may elect to focus his resources to fix the cold spot that affects the largest number of people, the cold-spot that affects the premium service people or the area that shows the greatest increase in the number of poor signal integrity per week.

Particular embodiments may also automatically identify when a new neighborhood is established and people traverse on newly paved roads. The mapping server may alert an administrator whether the area requires infrastructure enhancement or whether the existing system will suffice.

Figure 3:
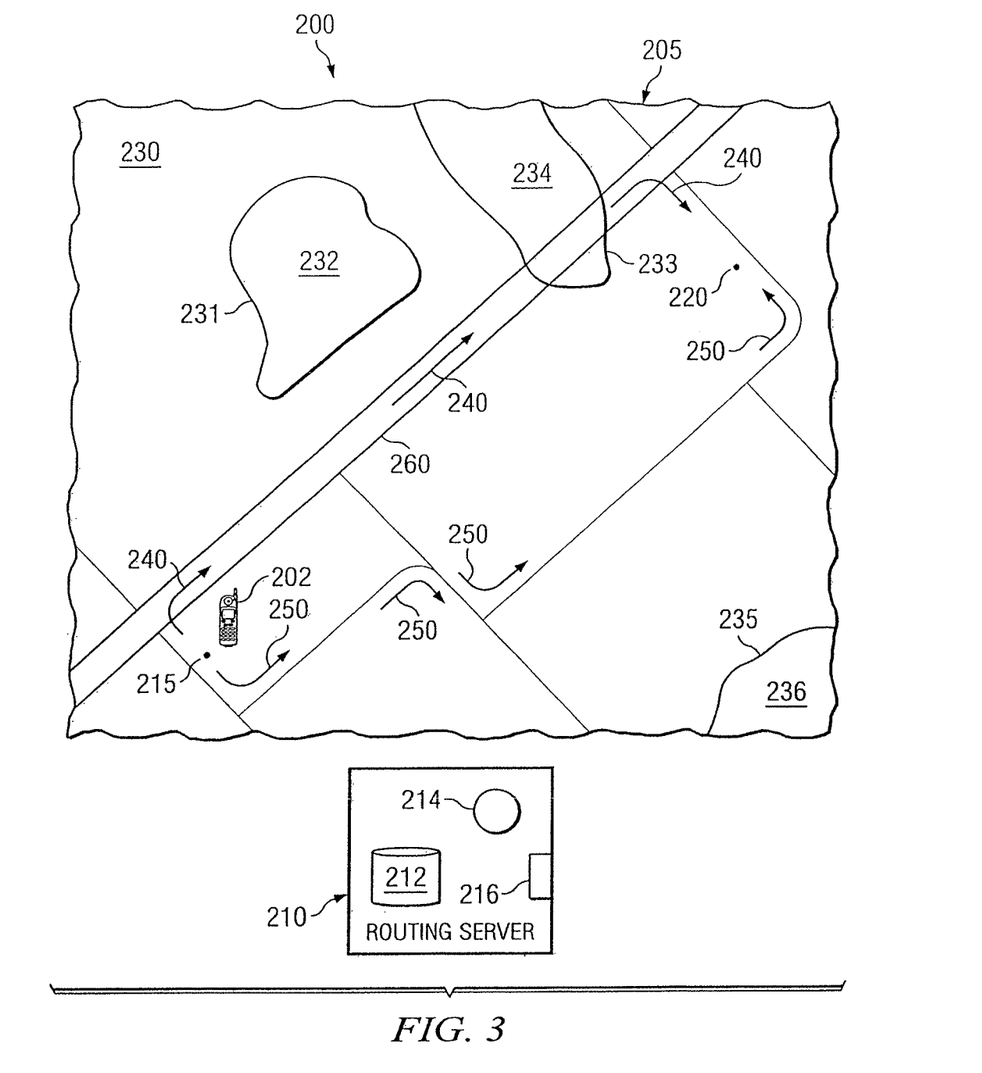
FIG. 3 illustrates aspects of operation of a routing server with respect to a geographic area, in accordance with a particular embodiment.

FIG. 3 illustrates a communication system 200 for using signal quality information, in accordance with a particular embodiment. Communication system 200 includes a mobile endpoints 202 in a geographic area 205. Communication system 200 also includes routing server 210 which may communicate with mobile endpoint 202 through one or more communication networks, such as communication network 20 of FIG. 1.

Mobile endpoint 202 may be similar to mobile endpoints 40 of FIG. 1 and may include similar components. Mobile endpoint 202 may communicate with other mobile endpoints and with other communication endpoints or network components through one or more communication networks such as cellular communication network 20 of FIG. 1. Mobile endpoint 202 may also communicate with a GPS network or another network to determine location information.

Routing server 210 includes an interface 216, a processor 214 and a memory module 212. Routing server 210 may be similar to routing server 60 of FIG. 1, and the interface, processor and memory module of routing server 210 may be similar to those components of routing server 60.

In the illustrated embodiment, geographic area 205 represents a locality such as a city or a portion of a city. Other embodiments may implement routing servers for any size geographic area. In the illustrated embodiment, geographic area includes regions 230, 232, 234 and 236. These regions are identified in the illustration by lines or boundaries 231, 233 and 235. Communications between mobile endpoint 202 and other mobile endpoints or network components, such as routing server 210, may be facilitated and supported by one or more communication networks in geographic area 205 such as communication network 20 of FIG. 1. Mobile endpoint 202 may receive varying communication signal quality in different regions of area 205. For example, when in region 230, mobile endpoint 202 may be better able to communicate with another endpoint or component than when in region 232. Reasons for varying signal quality in different regions may include placement or location of network components such as base stations, repeaters or other components and interference caused by particular network components or any other object. Signal quality may vary in different regions for any other particular reason.

The regions 230, 232, 234 and 236 are examples of regions having different signal qualities as identified by a mapping server using, for example, features and functionality described herein, such as features and functionality described with respect to mobile endpoints 102 and mapping server 110 of FIG. 2. Routing server 210 uses this information to provide better routes and directions to a mobile endpoint.

As an example in operation, a user of mobile endpoint 202 may desire to travel from location 215 to location 220. Processor 214 of routing server 210 may have calculated an optimal route from location 215 to location or destination 220 using information stored in memory 212, such as roadway, traffic and/or any other information that may be suitably used to calculate an optimal route. An example of such a route is identified by arrows 240. Arrows 240 demonstrate a route from locations 215 to destination 220 that includes highway 260 for a majority of the route. Highway 260 may be used for the route for any number of reasons, such as the use of this highway provides the shortest by time and/or the shortest by distance route between location 215 and destination 220. Memory 212 may store information such as road travel times and distances so that processor 214 may calculate routes based on this information. The calculated route may be communicated from routing server 210 to mobile endpoint 202 through interface 216 of routing server 210 and one or more communication networks.

As evident, the route identified by arrows 240 travels through regions 230 and 234. For purposes of this example, assume that region 230 has a high or acceptable signal quality and that region 234 has a low signal quality (as identified by a mapping server using other methods discussed herein). Thus, when positioned in or traveling through region 234, mobile endpoint 202 may suffer from bad quality on calls (e.g., dropped calls, poor voice quality or other issues as a result of low signal quality). Routing server 210 may communicate with a mapping server such as mapping server 110 to receive and store information about regions identified by the mapping server and region signal quality. In particular embodiments, routing server 210 may use this information to determine, calculate and/or update routes transmitted to mobile endpoint 202. In this example, routing server 210 may use this information to formulate a route from location 215 to destination 220. Thus, since this information would indicate that highway 260 passes through region 234 (a region of low signal quality), routing server may calculate a route from location 215 to destination 220 that avoids the portion of highway 260 passing through region 234. Such a route may be the route identified by arrows 250. As evident, this route travels only through region 230 which is a region of high or acceptable signal quality. If mobile endpoint 202 travels along this route from location 215 to destination 220, it has a reduced chance of experiencing problems communicating with other components than if it traveled on a route that passed through region 234.

Routing server 210 may use information identifying areas of differing signal quality to determine, calculate or update routes in any suitable manner. For example, depending on a user or administrator's instructions, routing server may calculate routes passing only through regions of particular signal qualities (e.g., such as acceptable or good signal quality). In some cases, routing server may calculate routes that include a maximum distance or time spent in a region of a particular signal quality, such as a poor signal quality, to minimize chances for communication issues. Any suitable methods may be used to account for regional signal quality in routing determinations.

In some embodiments, routing server 210 may update or change routes based on updated information from mapping server 110. For example, a network problem may occur creating a poor signal quality region while a mobile endpoint is traveling along a route provided by routing server 210 and, as a result, routing server 210 may change or update the previously provided route to avoid the region of poor signal quality.

In particular embodiments, routing server 210 may use regional signal quality information for different wireless or cellular providers to calculate route information. For example, a user of mobile endpoint 202 may notify routing server 210 that the mobile endpoint uses cellular provider A so that the routing server uses regional signal quality information of cellular provider A when calculating a route.

In particular embodiments, routing server 210 may use GPS or other location information (e.g., in a similar manner as used by mapping server 110) and a cell coverage map to identify a mobile endpoint heading towards a cold-spot while on an active call. As the endpoint approaches the cold-spot, routing server 210 may alert a user of the mobile endpoint of the cold-spot and advise him to either take an alternate route or to complete the call before he hits the cold-spot ahead. The alert may be provided via an audible tone, a whisper message, an SMS message or in any other suitable manner.

In some embodiments, a priority of a user of a mobile endpoint waiting on an active call in a queue may be altered when routing server 210 detects that the mobile endpoint is heading towards a cold-spot or other region of a particular signal quality. For example, a mobile endpoint may be placed in queue pending the availability of the next operator on a 911 emergency call. In accordance with particular embodiments, routing server 210 may use the location of the endpoint and calculate the route it is taking. If the mobile endpoint is heading towards a cold-spot, the server may first alert a user of the endpoint of the fact that he is heading towards the cold-spot. If the mobile endpoint continues to move in the same direction, routing server 210 may notify one or more network components (such as a 911 system component) to facilitate placement of the endpoint in a priority queue to ensure that the call is answered before the call is lost due to poor coverage. Similar functionality may be used by commercial call centers and/or call distributor systems to ensure that a call from a mobile endpoint is answered and fulfilled before the endpoint is disconnected because it has entered a cold-spot.

While particular embodiments are described with respect to particular functionality of various components, other embodiments may implement features in other ways. For example, while in some embodiments routing server 210 calculates routes and communicates the routes to mobile endpoints, in other embodiments mobile endpoints may perform routing server functionality described herein.

As indicated, in particular embodiments information identifying regions of varying signal quality (such as a cell or wireless coverage map) is used to optimize route information. Mapping and route selection algorithms may be enhanced to include cell and wireless coverage information. Thus, particular embodiments provide a manner for planning an optimal route for a trip that ensures quality cellular and or wireless coverage. In addition, some embodiments warn a mobile user before he is about to hit a cold-spot and advise him to stop and complete his call or take an alternate route. Moreover, some embodiments may change a priority of a mobile caller who is driving while he is in queue when he is about to hit a cold-spot.

Figure 4:
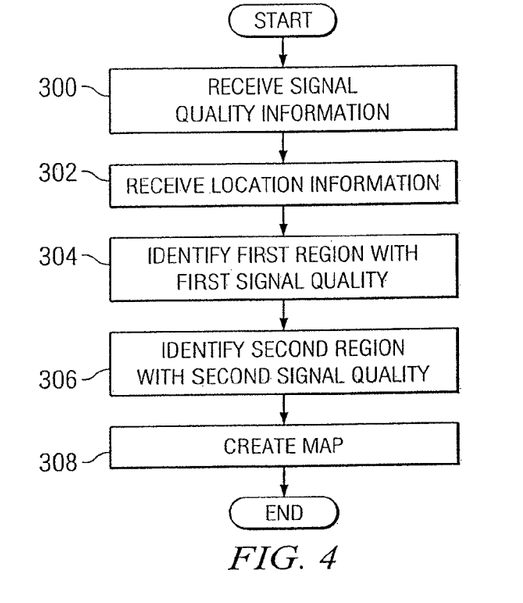
FIG. 4 is a flowchart illustrating a method for identifying wireless signal quality of a region, in accordance with a particular embodiment.

FIG. 4 is a flowchart illustrating a method for identifying wireless signal quality of a region, in accordance with a particular embodiment. The method begins at step 300 where signal quality information is received. Signal quality information may be received by an interface from a plurality of mobile endpoints in a particular area. The signal quality information may be based on any particular characteristic(s), such as packet loss, dropped calls, jitter buffer quality or any other measure. At step 302 location information is received. The location information may identify locations of the endpoints from which the signal quality information is received. The locations may be identified using any suitable method, such as triangulation or GPS technology.

At step 304, a first region of an area is identified having a first signal quality. Such identification is made based on the received signal quality and location information. For example, the signal quality and location information may include an identification of various signal qualities at various locations. Based on this, a processor may identify an area having a particular signal quality, such as a low signal quality which results in greater chance of problems on calls involving mobile endpoints. At step 306, a second region of the area is identified having a different signal quality, such as a higher signal quality, than that of the first region. Based on the identification of the first and second regions (and, for example, additional regions) and their signal qualities, a map is created at step 308. The map may be used for any number of reasons, such as an administrator identifying cold spots in a network or a routing device calculating directions for a traveling user that avoid regions of poor signal quality.

Figure 5:
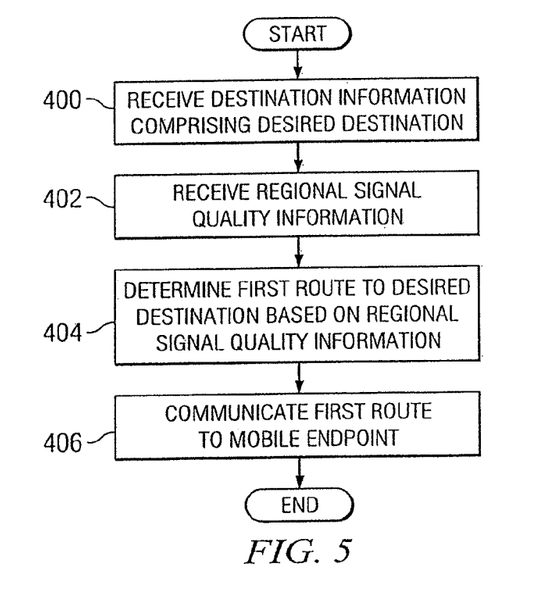
FIG. 5 is a flowchart illustrating a method for using signal quality information, in accordance with a particular embodiment.

FIG. 5 is a flowchart illustrating a method for using signal quality information, in accordance with a particular embodiment. The method begins at step 400 where destination information comprising a desired destination is received. The destination may be received, for example, from a mobile endpoint (e.g., after a user inputs the destination in the mobile endpoint). At step 402 regional signal quality information is received. This information identifies signal qualities for various regions in an area and may be received from any particular component, such as a mapping server.

At step 404, a first route to the desired destination is determined based on the regional signal quality information. The route may be determined, for example, by attempting to reduce time or distance spent in a region of poor signal quality as identified by the regional signal quality information. Other methods or goals may be used in determining the route based on the regional signal quality information. At step 406, the first route is communicated to a mobile endpoint where it may be presented to a user.

Some of the steps illustrated in FIGS. 4 and 5 may be combined, modified or deleted where appropriate, and additional steps may also be added to the flowcharts. Additionally, steps may be performed in any suitable order without departing from the scope of the invention.

Although particular embodiments have been described in detail with reference to particular embodiments, it should be understood that various other changes, substitutions, and alterations may be made hereto without departing from the spirit and scope of the inventions described. For example, although particular embodiments have been described with reference to a number of elements included within communication systems, including mapping and routing servers, these elements may be combined, rearranged or positioned in order to accommodate particular routing architectures or needs. In addition, particular elements such as processors, interfaces and memories of mapping and routing servers may be provided as separate external components to such servers or each other where appropriate. Additionally, functionality described herein may be provided in different manners than those described. For example, in some embodiments routes may be calculated by mobile endpoints themselves after receiving regional signal quality and other information. Particular embodiments contemplate great flexibility in the arrangement of these elements as well as their internal components.

In addition, although some embodiments have been described with respect to mobile endpoints such as cell phones and cellular service providers, one skilled in the art should recognize that this invention equally applies to mobile VoIP devices operating over WiMax (Worldwide Interoperability for Microwave Access) or any other mobile communications system, such as a land mobile radio system.

Numerous other changes, substitutions, variations, alterations and modifications may be ascertained by those skilled in the art and it is intended that some or all such changes, substitutions, variations, alterations and modifications may fall within the spirit and scope of the appended claims. Moreover, embodiments are not intended to be limited in any way by any statement in the specification that is not otherwise reflected in the claims.

Technical advantages of particular embodiments include the use of GPS or other location information and voice quality, signal quality or other quality information to create and continuously update a wireless signal integrity map. The automatic update of a wireless and cellular signal integrity map may reduce the need to send dedicated technicians to an area under surveillance. In an enterprise, this may reduce the necessity to order an expensive site survey in the event that antennas have been inadvertently moved. In a service provider, this may enable the service provider to get instantaneous updates about the impact of new construction (e.g., new buildings) that may affect the integrity of cellular or other wireless signals. These features may reduce the overall cost of ownership of a cellular or other wireless network.

Other technical advantages of various embodiments include use of a cell coverage map identifying areas of differing signal quality to calculate directions. An area of poor signal quality may be avoided in the calculation, modification or update of a route so that a user traveling on the route will have a reduced chance of poor call or communication session quality.

Other technical advantages will be readily apparent to one skilled in the art from the following figures, descriptions and claims. Moreover, while specific advantages have been enumerated above, various embodiments may include all, some or none of the enumerated advantages.

What is claimed is:

1. A method, comprising:
   receiving signal quality information associated with wireless signals communicated with each of a plurality of mobile endpoints;
   receiving location information identifying locations of each of the plurality of mobile endpoints;
   based on the received signal quality information and the received location information, identifying a first region of an area, the first region having a first signal quality;
   based on the received signal quality information and the received location information, identifying a second region of the area, the second region having a second signal quality;
   wherein the second signal quality is higher than the first signal quality.

2. The method of claim 1, further comprising, based on the received signal quality information and the received location information, identifying a third region of the area, the third region having the first signal quality.

3. The method of claim 1, further comprising:
based on the received signal quality information and the received location information:
identifying a first one or more regions of the area, the first one or more regions each having the first signal quality; and
identifying a second one or more regions of the area, the second one or more regions each having a second signal quality; and
based on the identification of the first one or more regions and the second one or more regions, creating a map to identify regions of different signal qualities.

4. The method of claim 1, further comprising monitoring mobile endpoint jitter buffers to determine the signal quality information associated with wireless signals received by each of the plurality of mobile endpoints.

5. The method of claim 1, further comprising identifying packet loss to determine the signal quality information associated with wireless signals received by each of the plurality of mobile endpoints.

6. The method of claim 1, wherein identifying the first region of the area comprises identifying a boundary representing locations at which a threshold signal quality is crossed.

7. The method of claim 1, wherein receiving signal quality information associated with wireless signals received by each of a plurality of mobile endpoints comprises receiving notifications from the plurality of mobile endpoints that the endpoints are losing keep alive signals with one or more base stations.

8. The method of claim 1, further comprising transmitting a notification that the first region having the first signal quality has been identified.

9. A system, comprising:
an interface operable to:
receive signal quality information associated with wireless signals communicated with each of a plurality of mobile endpoints;
receive location information identifying locations of each of the plurality of mobile endpoints;
a processor coupled to the interface and operable to:
based on the received signal quality information and the received location information, identify a first region of an area, the first region having a first signal quality;
based on the received signal quality information and the received location information, identify a second region of the area, the second region having a second signal quality; and
wherein the second signal quality is higher than the first signal quality.

10. The system of claim 9, wherein the processor is further operable to, based on the received signal quality information and the received location information, identify a third region of the area, the third region having the first signal quality.

11. The system of claim 9, wherein the processor is further operable to:
based on the received signal quality information and the received location information:
identify a first one or more regions of the area, the first one or more regions each having the first signal quality; and
identify a second one or more regions of the area, the second one or more regions each having a second signal quality; and
based on the identification of the first one or more regions and the second one or more regions, create a map to identify regions of different signal qualities.

12. The system of claim 9, wherein the processor is further operable to monitor mobile endpoint jitter buffers to determine the signal quality information associated with wireless signals received by each of the plurality of mobile endpoints.

13. The system of claim 9, wherein the processor is further operable to identify packet loss to determine the signal quality information associated with wireless signals received by each of the plurality of mobile endpoints.

14. The system of claim 9, a processor operable to identify the first region of the area comprises a processor operable to identify a boundary representing locations at which a threshold signal quality is crossed.

15. The system of claim 9, the interface operable to receive signal quality information associated with wireless signals received by each of a plurality of mobile endpoints comprises an interface operable to receive notifications from the plurality of mobile endpoints that the endpoints are losing keep alive signals with one or more base stations.

16. The system of claim 9, wherein the processor is further operable to transmit a notification that the first region having the first signal quality has been identified.

17. Logic embodied in a non-transitory computer readable medium, the non-transitory computer readable medium comprising code operable to:
receive signal quality information associated with wireless signals communicated with each of a plurality of mobile endpoints;
receive location information identifying locations of each of the plurality of mobile endpoints;
based on the received signal quality information and the received location information, identify a first region of an area, the first region having a first signal quality;
based on the received signal quality information and the received location information, identify a second region of the area, the second region having a second signal quality; and
wherein the second signal quality is higher than the first signal quality.

18. The non-transitory computer readable medium of claim 17, wherein the code is further operable to, based on the received signal quality information and the received location information, identify a third region of the area, the third region having the first signal quality.

19. The non-transitory computer readable medium of claim 17, wherein the code is further operable to: based on the received signal quality information and the received location information: identify a first one or more regions of the area, the first one or more regions each having the first signal quality; and identify a second one or more regions of the area, the second one or more regions each having a second signal quality; and based on the identification of the first one or more regions and the second one or more regions, create a map to identify regions of different signal qualities.

20. The non-transitory computer readable medium of claim 17, wherein the code is further operable to monitor mobile endpoint jitter buffers to determine the signal quality information associated with wireless signals received by each of the plurality of mobile endpoints.

21. The non-transitory computer readable medium of claim 17, wherein the code is further operable to identify packet loss to determine the signal quality information associated with wireless signals received by each of the plurality of mobile endpoints.

22. The non-transitory computer readable medium of claim 17, wherein code operable to identify the first region of the area comprises code operable to identify a boundary representing locations at which a threshold signal quality is crossed.

23. The non-transitory computer readable medium of claim 17, wherein code operable to receive signal quality information associated with wireless signals received by each of a plurality of mobile endpoints comprises code operable to receive notifications from the plurality of mobile endpoints that the endpoints are losing keep alive signals with one or more base stations.

24. The non-transitory computer readable medium of claim 17, wherein the code is further operable to transmit a notification that the first region having the first signal quality has been identified.

25. A system, comprising:
   means for receiving signal quality information associated with wireless signals communicated with each of a plurality of mobile endpoints;
   means for receiving location information identifying locations of each of the plurality of mobile endpoints;
   means for, based on the received signal quality information and the received location information, identifying a first region of an area, the first region having a first signal quality;
   means for, based on the received signal quality information and the received location information, identifying a second region of the area, the second region having a second signal quality; and
   wherein the second signal quality is higher than the first signal quality.

* * * * *